Figure 1:
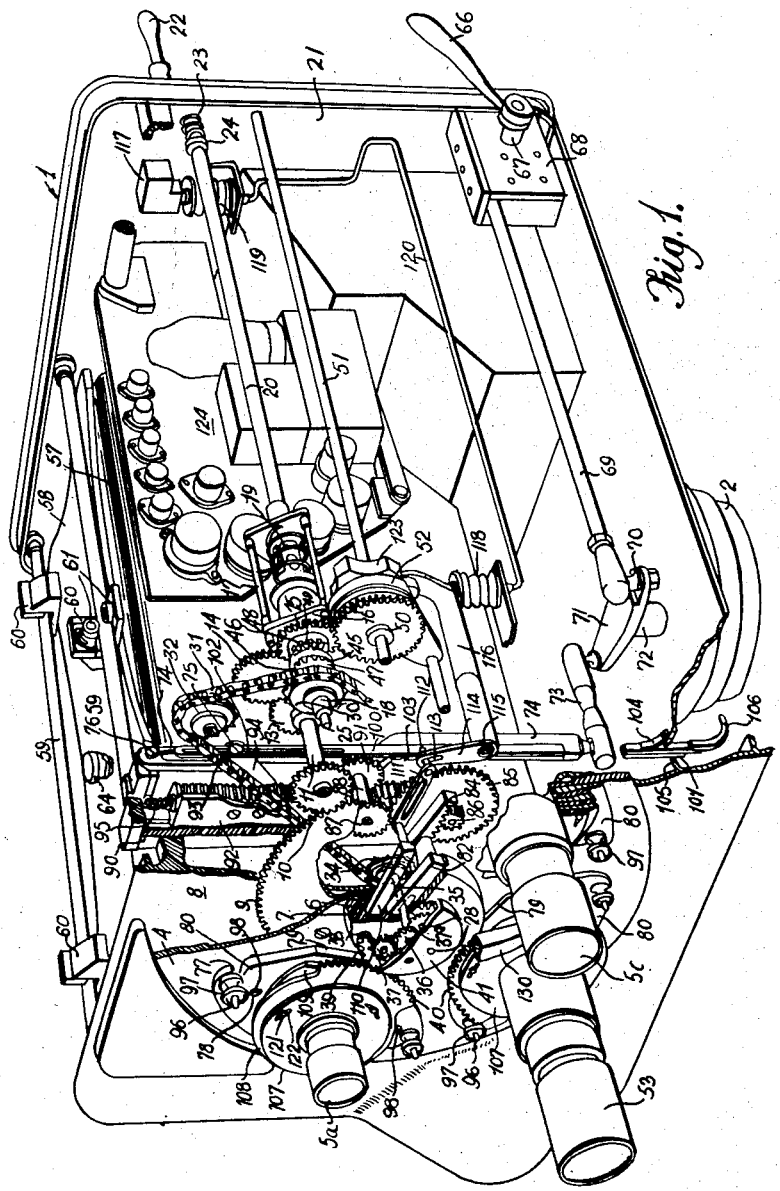

Oct. 23, 1951  D. JACKSON ET AL  2,572,729
TELEVISION CAMERA FOCUSING MECHANISM
Filed March 14, 1949  5 Sheets-Sheet 2

Inventors
Donald Jackson
John D. F. Green
By: Emery, Holcomb & Blair
Attorney

Oct. 23, 1951 D. JACKSON ET AL 2,572,729
TELEVISION CAMERA FOCUSING MECHANISM
Filed March 14, 1949 5 Sheets-Sheet 4

Inventors:
Donald Jackson
John D. F. Green
By: Emery, Holcombe & Blair
Attorney

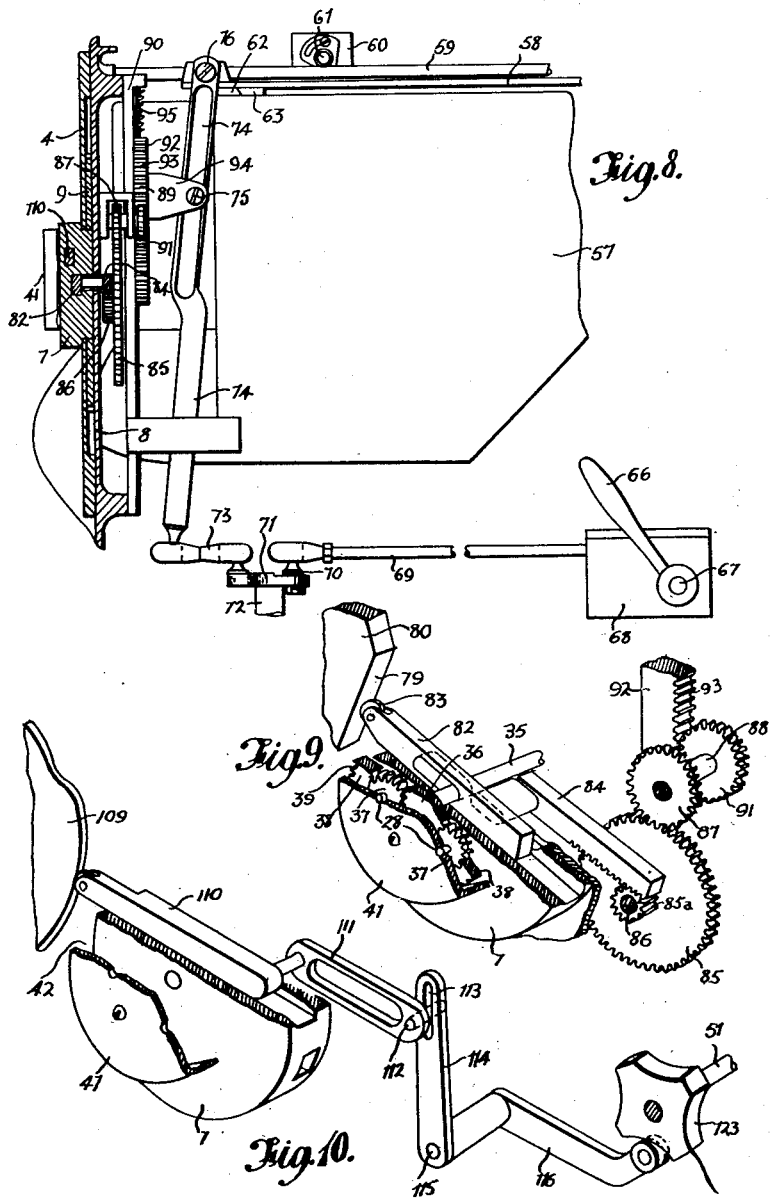

Patented Oct. 23, 1951

2,572,729

UNITED STATES PATENT OFFICE 2,572,729

TELEVISION CAMERA FOCUSING
MECHANISM

Donald Jackson and John Dudley Francis Green,
Cambridge, England, assignors to Pye Limited,
Cambridge, England, a British company Application March 14, 1949, Serial No. 81,234
In Great Britain March 16, 1948

17 Claims. (Cl. 178—7.2)

1

The present invention relates to cameras, particularly television cameras.

When televising live action scenes it is often desirable to change the lens in the television camera, and for this purpose a plurality of lenses may be mounted upon a turret arranged on the front of the camera which can be rotated to bring any one of the lenses mounted thereon into the operative position in alignment with the optical axis of the pick-up tube, the turret being locked in the various operative positions by means of suitable indexing means. With a change of lens the camera has to be re-focussed which may be effected by moving the pick-up relative to the lens positioned in front thereof. With different lenses the relative movement of the lens and pick-up tube for focussing through all distances up to infinity changes, but it is desirable that the focus control should be adjustable through the same range of movement irrespective of the lens which is in use.

An object of the present invention is to provide a focus control which enables this result to be obtained. To this end, according to one aspect, the invention consists in a focus control for television cameras having a plurality of different lenses carried upon a movable turret, wherein means are provided for automatically altering the gear or leverage ratio between the focussing control knob or the like and the member adjusting the pick-up tube with respect to the lens when the focus control knob or the like is operated, in accordance with the particular lens which is positioned in the operative position, whereby the focus control knob or the like is turned or moved through approximately the same distance for focussing the camera from close ups to infinity irrespective of the lens which is in use.

In one embodiment for carrying out the invention, the operation of the focus control knob or the like moves the pick-up tube within the camera through a lever mechanism of which the fulcrum point is changed depending upon the particular lens which is moved into the operative position. The lenses are all mounted upon a rotatable turret carried at the front of the camera which may be rotated and locked in the various positions in which the different lenses are arranged in front of the pick-up tube, the turret also carrying a plurality of members which, when positioned in the various indexing positions, move the fulcrum for the focussing lever to a position corresponding to the lens in use. These members may comprise projections or cam

2 surfaces carried by the turret plate. By suitably dimensioning these cam surfaces the position of the fulcrum may be adjusted so as to provide the appropriate movement of the pick-up tube for a full movement, generally 180°, of the focus control knob.

According to a further feature of the invention, the lenses are made de-mountable from the rotatable turret and are carried by a member which is adapted to be secured to the turret, said member being formed with or carrying a projection or cam surface which is adapted to adjust the gear or leverage ratio of the focussing mechanism when that lens is positioned in the operative position in front of the pick-up tube. The lens support may comprise a plate member provided with apertures adapted to fit upon dowels projecting from the turret plate to locate the lens in correct position on the turret. The plate may be formed with a flat side surface which is spaced a predetermined distance from the axis of the lens corresponding to the particular lens mounted on the plate and is adapted to bear against a push rod or tappet when the lens is in the operative position so as to adjust the setting of the fulcrum point of a lever of the focussing mechanism. The lens plates may be provided with apertures or slots by means of which they may be fitted over screwed studs for holding the plates in position on the dowels. Two or more dowels are preferably provided which should be of different sizes in order to ensure that the lens plate can only be mounted in a single position on the turret plate. The lens plates are designed for the particular lens to be carried so when a lens unit is interchanged, the new lens plate will automatically ensure the correct fulcrum setting for the substitute lens when it is in the operative position.

It is also desirable that the adjustment of the iris diaphragms of the various lenses should be indicated by means visible from the rear of the camera and that they should also be adjustable from this position, thus enabling the operator to know the correct stop of the lens which is located in front of the pick-up tube. A further object of the invention is to provide a control and indicating arrangement for the iris diaphragms of the different lenses mounted on the turret which is visible and operable from the rear of the camera.

According to this feature, the invention also consists in a television camera having a plurality of different lenses and associated iris diaphragms mounted on a turret at the front of the camera, wherein each diaphragm control means is connected to a cam which is adapted to engage with means, such as a tappet, for actuating an indicator when the associated lens is positioned in the operative position on the camera, the rotation of the diaphragm control means thereby also moving the cam and altering the setting of the indicator which may be located at the rear of the camera. The cams associated with the diaphragm control means of the different lenses are so shaped, corresponding to the lenses with which they are associated, that the indicator which may be calibrated in "*f*" numbers, will give the correct reading irrespective of the particular lens which is in use at any time. Furthermore, since the indicator is set by a cam which is moved into the operative position as the turret is rotated, the setting is correct without having to restore both the indicator and diaphragm to a zero setting before bringing them into operative co-relation.

The diaphragm control means may also carry a toothed segment which is adapted to engage with a driving gear when the associated lens is moved to the operative position. This driving gear may be coupled to an operating knob or the like arranged adjacent the rear of the camera and is preferably coupled with the locking pin or the like associated with the indexing means so that, when the locking pin is withdrawn to allow the turret to be rotated, the driving gear is simultaneously disengaged from the gear segment of the diaphragm control means, the driving gear being engaged with the diaphragm control means of the next lens which is moved to the operative position when the locking pin is again moved to the locking position to hold the turret in the new position.

Since a wide range of lenses may be mounted upon the turret plate of which the iris diaphragm cams are of widely different shape, a further feature of the invention consists in withdrawing the iris tappet whilst the turret is turning and allowing it to move back into engagement with the iris cam as the turret approaches an indexing position.

Figure 2:
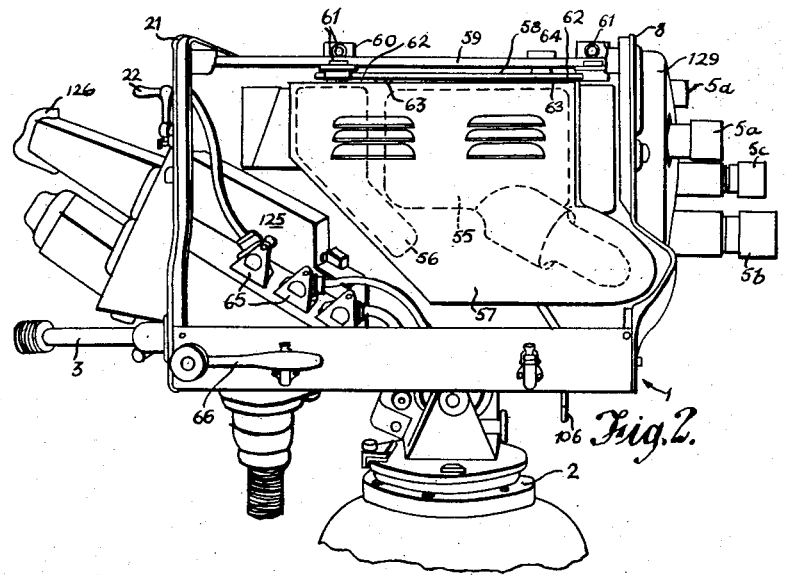
Figure 3:
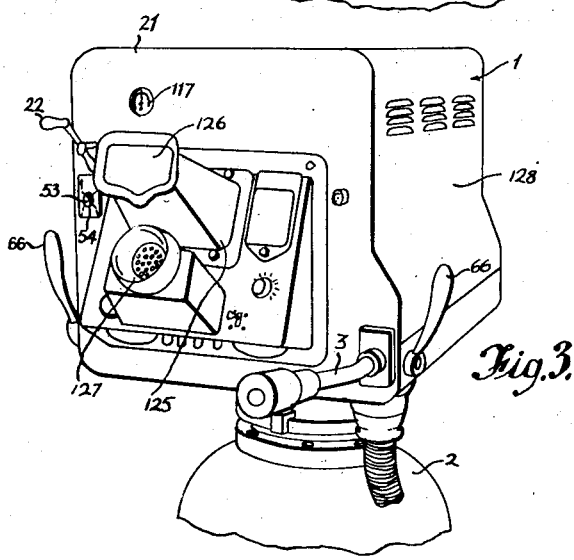
Figure 4:
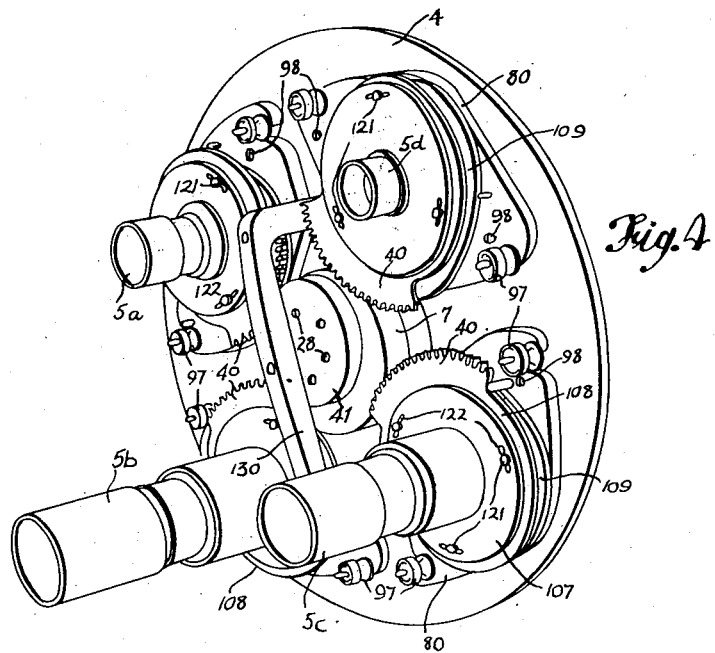
Figure 5:
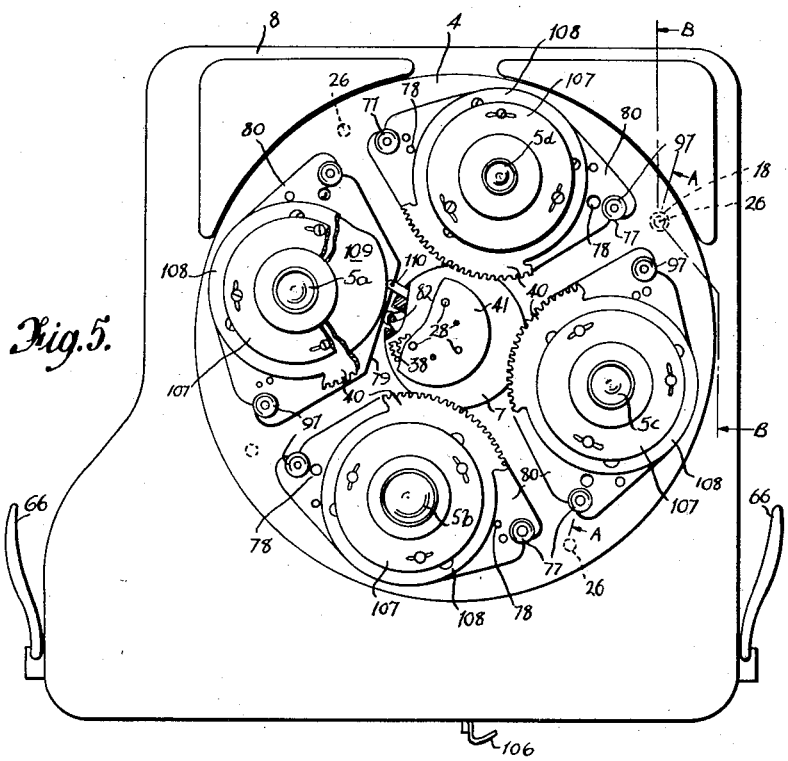
Figures 6, 7:
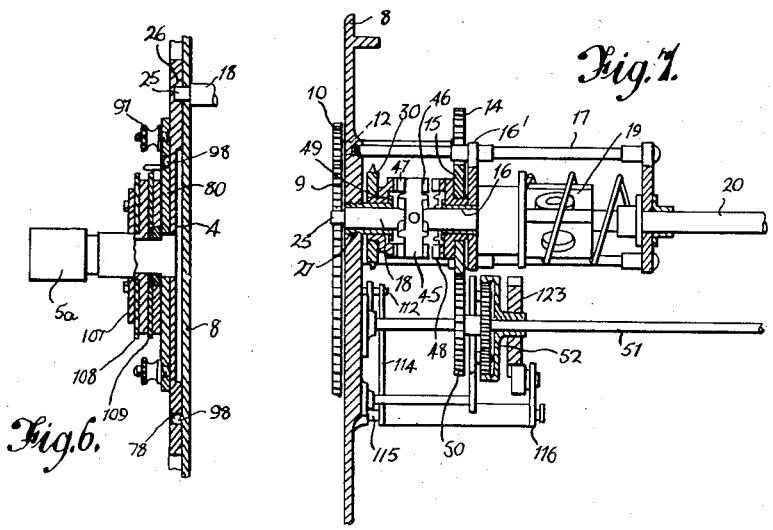

In order that the invention may be more clearly understood, reference will now be made to the accompanying drawings, in which:

Fig. 1 shows a perspective view of the camera from the front and partly cut away to show the details and arrangement of the operating mechanism; all cover plates being removed, Fig. 2 shows a side view of the camera from the other side, Fig. 3 shows a perspective view of the rear of the camera, Fig. 4 shows a perspective view of the turret with its cover plate removed, Fig. 5 is a front view of Fig. 4 with some parts cut away to show constructional details, Fig. 6 shows a section through the lens unit along the line A—A in Fig. 5, Fig. 7 shows a scrap side view, partly in section of the clutch mechanism for driving either the turret or iris diaphragm, together with the adjacent mechanism, the view being taken approximately along the line B—B in Fig. 5, Fig. 8 is a scrap side view of the focussing lever mechanism, with the camera front wall, turret plate and boss shown in section, Fig. 9 is an enlarged cut-away perspective view of the boss showing the coupling between the focussing tappet and the mechanism within the camera box, Fig. 10 is an enlarged cut-away perspective view of the boss showing the coupling between the iris tappet and the mechanism within the camera box.

Fig. 11 shows diagrammatically a modified arrangement for electrically producing the remote indication of the iris diaphragm setting both on the camera and at other points in the camera control apparatus.

Referring to the drawings, the television camera 1 is generally of rectangular box-like form and is mounted upon a stand 2 so as to be movable in both horizontal and vertical directions by moving the handle 3. On the front of the camera is mounted a rotatable turret plate 4 carrying any convenient number of lenses 5, shown as four lenses 5*a*, 5*b*, 5*c*, 5*d* in the drawings. The turret plate 4 is rotatable around the reduced diameter portion 6 of a central boss 7 secured to the front wall 8 of the camera box, the boss 6 being separate from the front wall 8 but secured thereto by screws or in any other convenient manner after the turret plate has been positioned over the reduced diameter portion 6. The rear surface of the turret plate 4 has a recessed central portion within which is fitted a gear wheel 9 rigid with the turret plate 4 and of a thickness corresponding approximately to the depth of the recess in the back of the turret plate. This gear 9 meshes with a pinion 10 carried on the shaft 11 rotatable in a bearing 12 in the front wall 8, the inner end of the shaft 11 carrying a further pinion 13 which meshes through an idler pinion 14 with a pinion 15 freely rotatable about a tubular bearing 16 extending from the adjacent end plate 16' of the bearing frame 17 carried from the inner surface of the front wall 8.

Through the tubular bearing 16 passes a rod 18 which is connected, through the universal joint 19, to a rod 20 which extends through an aperture in the back wall 21 of the camera and terminates in an operating handle 22. The rod 20 is normally urged towards the front of the camera by a spring 23 positioned between the back wall 21 and a collar 24 on the rod 20. The front end of the rod 18 carries a pin 25 which is adapted to engage in index apertures 26 in the turret plate 4, the pin being normally spring-urged towards the turret plate by the spring 23. The front end of the rod 18 is slidable in a bearing 27 carried by the front wall 8 and on which is freely rotatable a sprocket wheel 30. The teeth of the sprocket engage a chain 31 which also passes over idler sprockets such as 32, and a sprocket 34 on the end of a shaft 35 which extends through the boss 7. To the front end of the shaft 35 is secured a pinion 36 which meshes with three pinions 37 disposed therearound and rotatable on pins 28 projecting from the front surface of the boss 7. The pinions 37 in turn engage with the toothed internal periphery of a ring 38, the external periphery of which is also provided with a series of teeth 39. The shaft 35 is arranged eccentric to the axis of the boss 7 so that the toothed ring 38 is arranged towards one side of the boss and its teeth 39 can engage with the toothed segment 40 fast with the member for adjusting the iris diaphragm of the lens 5*a* which is in the operative position, that is the lens which is in line with the optical axis of the television pick-up tube in the camera. By rotating the shaft 35, the toothed ring 38 is rotated and moves the segment 40 to adjust the iris diaphragm of the lens in the operative position as will be more fully hereinafter described. The pinions 36, 37 and the ring 38 may be enclosed by a cover member 41 which has an opening 42 at the side thereof opposite the lens which is in the operative position to permit the teeth 39 of the ring 38 to engage with the toothed segment 40.

Carried by and fast with the rod 18 between the pinion 15 and the sprocket 30 is a disc 45 having clutch teeth 46, 47 extending from each of its opposite surfaces, which clutch teeth are adapted to engage with the complementary clutch teeth on either one or other of two co-axial clutch parts 48, 49 rigid with the pinion 15 and the sprocket 30 respectively, depending upon whether the turret control rod 20 is pulled rearwards or is resting in its advanced position with the pin 25, holding the turret plate 4 in an indexed position. When the rods 18 and 20 are in their forward position with the pin 25 in an indexing aperture 26 in the turret plate 4, the teeth 47 on the disc 45 engage the teeth 49 rigid with the sprocket wheel 30, whilst the teeth 46 are disengaged from the teeth 48 on the pinion 15. By rotating the handle 22 when the clutch disc 45 is in this position, the sprocket wheel 30 is driven to move the chain 31 and thus, through the intermediary of the sprocket 34, shaft 35 and pinions 36 and 37, rotate the teethed ring 38 to move the toothed segment 40 to adjust the iris diaphragm setting of the lens 5a in the operative position. When the handle 22 is pulled rearwardly, it retracts the rods 20 and 18 to pull the pin 25 out of the indexing aperture 26 in the turret plate 4, simultaneously disconnecting the teeth 47 of the disc 45 from the teeth 49 and engaging the teeth 46 of the disc with the teeth 48 rigid with the pinion 15. Upon now rotating the handle 22, the pinion 15 is rotated, and through the train of gears 14, 13, 10, 9, the turret plate 4 is rotated around the boss 7. As soon as the turret plate moves, the indexing aperture 26 moves out of alignment with the pin 25 and thus holds the rods 18 and 20 retracted until the turret plate 4 is turned through a quarter turn and the next indexing position is reached, when the pin 25, under the action of the spring 23, moves forwards into the indexing aperture to disengage the teeth 46 and 48 and again engage the teeth 47, 49, whereby further rotation of the handle 22 actuates the diaphragm control of the lens now moved into the operative position and of which the toothed segment 40 is in mesh with the teeth 39 of the ring 38.

In mesh with the pinion 15 is a gear wheel 50 which is rotatable around the shaft 51 which is rotatable in bearings in the front and rear walls of the camera box. The gear 50 is coupled to drive the shaft 51 through a reduction gearing, such as an epicyclic gear, contained in the casing 52. The gear ratio of the wheel 50 and the epicyclic gear 52 with respect to the pinion 15 is made the same as the gear ratio between the pinion 15 and the gear wheel 9 fast with the turret plate 4 so that the turret plate 4 and the shaft 51 rotate at the same speed. The rear end of the shaft 51 carries a pointer 53 (Fig. 3) on the outside of the back wall 21 of the camera box, pointer 53 moving over a dial 54 to indicate, at the rear of the camera, which of the four lenses 5 on the turret is in the operative position.

The television pick-up tube 55 of the camera, with its associated amplifier 56, is mounted in a box 57 supported by the cradle 58 which is mounted for forward and backward movement within the camera box along the slide rails 59, extending between the front and back walls of the camera box and adjacent the top edges thereof. The cradle 58 carries bracket members 60 with rollers 61 engaging with the rails 59, so that the path along which the cradle, and the pick-up tube mounted in the box 57, can move is guided along the optical axis of the lens 5 which is in the operative position. The pick-up tube box 57 is detachable from the cradle 58, being supported from the underside of the cradle by the interengaging dove-tail slides 62, 63 carried by the cradle 58 and the box 57 respectively. The box 57 is held secure with the cradle 58 by the screw 64, removal of the screw 64 permitting the box to be slid sideways and removed from the cradle for servicing. The electrical leads from the pick-up tube 55 and amplifier 56 in the box terminate in connectors 65 which can be plugged into complementary connectors mounted in the camera box.

The focussing of the camera is effected by adjusting the position of the box 57, and thus the pick-up tube 55, relative to the lens 5 by moving the cradle 58 back and forth along the rails 59. This movement is effected by the two focussing knobs or handles 66 carried at opposite ends of a shaft 67 which extends between both sides of the camera box and adjacent the rear thereof, so that the camera operator can focus the camera by actuating either one or other of the two knobs 66 located at opposite sides of the camera. The knobs 66 are rotatable through an arc of 180°, the movement being limited by stops (not shown). The shaft 67 is coupled, through reduction gearing contained in the box 68, with a longitudinally movable rod 69 connected through a ball joint 70 to one arm of a lever 71 pivoted to the bottom wall of the camera box at 72. The other arm of the lever 71 is connected through a rod 73, with ball joints at each of its ends, to the lower end of the focussing lever 74 which is pivoted for rocking movement about a fulcrum 75, the upper end of the focussing lever 74 being pivotally connected to the cradle 58 by the screw 76. Thus by rotating the handle 66 back and forth, the focussing lever 74 is rocked about the fulcrum 75 to move the box 57 towards or away from the lens 5 in the operative position.

It will be appreciated that the distance through which the cradle 58 must be moved to focus the camera from all distances between close ups and infinity will depend upon the particular lens 5 which is in the operative position. For simplicity of operation and in order to reduce as far as possible the risk of bad focussing during the televising of live scenes, it is desirable that the focussing handle 66 should move through the same arc, in order to cover the whole focussing range from close ups to infinity, irrespective of the lens which is in the operative positions. This is achieved, according to the invention, by automatically shifting the position of the fulcrum 75 in accordance with the particular lens which is in the operative position. The ratio of movement between the operating handle 66 and the cradle 58 is automatically changed, when the turret is turned to bring another lens into the operative position, so that a full movement of the handle 66, which is 180° in the camera described, will move the cradle and pick-up tube through the distance necessary to focus the camera, with the particular lens in the operative position, through all desired distances up to infinity.

This automatic adjustment of the fulcrum 75 is effected by means of a control surface 79 on the plate 80 forming the support for the lens 5, which surface 79, when the associated lens is moved into the operative position, engages with and moves a tappet 82 slidable in the boss 7 to actuate gearing which adjusts the position of the fulcrum 75 in dependence upon the position of the tappet 82. The control surface 79 on the plate 80 is preferably constituted by a flat side surface on the plate which is spaced a predetermined distance from the axis of the lens, and thus also from the axis about which the turret plate 4 rotates, corresponding to the particular lens 5 mounted on the plate 80, and is adapted to bear against the roller 83 at the end of the tappet 82 when that lens is in the operative position and thus, through the train of gearing, adjusts the fulcrum 75 to a corresponding position.

The movement of the focussing tappet 82 is transmitted to a rack 84 arranged inside the camera box which meshes with a pinion 85a which is integral with a gear wheel 85 rotatable on a spindle 86 carried by the inside of the front wall 8 of the camera box, the gear 85 meshing with a pinion 87 secured on a shaft 88 rotatable in a bearing 89 carried by the fulcrum rack guide 90 secured in a vertical position within the camera box. Secured on the other end of the shaft 88 is a pinion 91 which meshes with the teeth of the fulcrum rack 92. The fulcrum rack 92 comprises a generally rectangular member having rack teeth 93 along one edge thereof and carrying the U-shaped bracket 94 carrying the fulcrum pin 75. The fulcrum rack 92 is vertically movable in the fulcrum guide 90 and is urged upwardly by the spring 95 connected between the fulcrum rack and the top of the fulcrum guide.

With the mechanism described, when the focussing tappet 82 is pushed into the boss 7, the pinion 91 rotates to drive the fulcrum rack 92 downwardly against the action of the spring 95, and thereby reduce the leverage ratio between the two arms of the focussing lever 74 on opposite sides of the fulcrum 75. When the tappet 82 is released, the spring 95 pulls the fulcrum rack 92 upwards, thereby pushing the focussing tappet 82 outwards. The tappet 82 moves into this position when the turret plate 4 is turning and no control surface 79 of a lens plate 80 is engaging therewith. Upon the control surface 79 of the lens plate 80 which is being moved into the operative position engaging with the focussing tappet 82, the gearing train is actuated to move the fulcrum rack 92 to the position corresponding to the control surface 79 to give the correct leverage ratio to the focussing lever 74 for the particular lens concerned.

The lenses are demountable from the turret plate and are carried by the plate member 80 which is provided with apertures or slots 77 by means of which they may be mounted over screwed studs 96 projecting from the turret plate 4, and secured thereto by means of captive nuts 97. The plate 80 is also provided with apertures 78 (Fig. 5) adapted to fit upon dowels 98 (Fig. 4) projecting from the turret plate 4 to locate the lens in the correct position on the turret. Two or more dowels are preferably provided which are preferably of different sizes so as to ensure that the plate 80 can only be mounted in a single position on the turret plate. The lens supporting plates 80 have their control surfaces 79 spaced from the axis of the lens by a distance corresponding to the particular lens which is mounted on the plate, so that when a lens unit is interchanged, the new lens supporting plate will automatically ensure the correct fulcrum setting for the substitute lens when it is in the operative position.

A feature of the invention consists in the provision of a separate manual control means for shifting the position of the fulcrum 75 in one direction independently of the setting of the focussing tappet 82. This means comprises the slotted rod 100 which extends vertically through an aperture 101 in the bottom of the camera box, the slot 102 in the rod fitting over the end of the fulcrum pin 75. By pulling this rod down, the fulcrum pin 75 can be pulled to its lowermost position, corresponding to maximum movement of the cradle. In this position the lever may be held by a latch, shown as comprising a notch 103 in the side of the rod 100 which is adapted to engage with the bottom wall of the camera casing, a spring 104 being provided for urging the notch 103 into engaging position. To release the manual control rod 100, it is moved sideways against the action of the spring 104 to release the notch 103, whereby it can be moved upwards either manually or by the spring 95 acting on the fulcrum rack 92. The rod 100 may be held in its uppermost position by a further notch 105 in its side and adapted to engage with the bottom wall of the camera box. The rod 100 may be moved up and down by the bent handle 106 extending beneath the bottom wall of the camera box. The slot 102 in the rod enables the fulcrum normally to move up and down under the action of the focussing adjusting tappet without restraint.

For actuating the iris diaphragm of a lens, the diaphragm control ring 107 of the lens is rigidly connected to a plate 108 having a toothed segment 40 on its periphery which meshes with the teeth 39 on the outer periphery of the ring 38 when that lens is moved into the operative position. The adjustment of the iris diaphragm is effected by rotating the handle 22 when the rod 20 is in its foremost position, the drive being effected through the chain 31 as previously described.

For indicating, at the rear of the camera, the diaphragm setting, the plate 108 has secured thereto a cam plate 109 of which the cam surface is adapted to engage and move a second tappet 110 slidable in the central boss 7 as the cam is turned. This iris tappet 110 is rigid with a rod 111 arranged inside the camera box, the end of which engages, through the pin 112 with the slot 113 in one arm of a bell crank lever 114 which can rock about the spindle 115 carried from the front wall 8 of the camera box. The second arm 116 of the bell crank lever 114 actuates the mechanism for transmitting the movement of the arm to actuate the iris diaphragm indicator 117 arranged on the back wall of the camera. This transmission mechanism may be of any convenient type, for example, electrical or mechanical, and is shown as a hydraulic system comprising a pair of sylphan bellows 118, 119 interconnected by the oil pipe line 120. The bellows 118 is actuated by the movement of the arm 116 and produces corresponding movement of the bellows 119 for actuating the iris diaphragm indicator 117.

Each of the iris diaphragm cams 109 carried by the lenses is designed to correspond with the iris diaphragm of the particular lens by which it is carried so that a correct indication is given on the indicator 117 of the diaphragm setting of the lens in the operative position. A limited adjustment between the cam 109 and the iris diaphragm may be effected by the diaphragm control ring 107 of the lens being secured to the plate 108 and the cam 109 by bolts 121 passing through slots 122 in the ring 107.

Since a wide range of lenses may be mounted on the turret plate of which the iris diaphragm cams 109 may be of widely different shape, means are provided for withdrawing the iris tappet 110 whilst the turret plate is turning, and allowing it to move back into engagement with the iris cam as the turret approaches an indexing position. This avoids the damage which might take place if the turret were rotated in a direction opposite to the lead-in direction of the cam, and enables the turret to be rotated in either one direction or the other. For this purpose the shaft 51 carries a square or cross-shaped cam 123 which engages the end of the arm 116 of the bell-crank lever 114, when the cam 123 is turned, to move the bell-crank lever and withdraw the iris tappet 110 into the central boss 7. As above explained, the shaft 51, and consequently the cam 123, rotate at the same speed as the turret plate 4, so that when the turret reaches an intermediate position, the cam 123 depresses the arm 116 to retract the iris tappet 110, the cam 123 moving out of engagement with the arm 116 as the turret approaches an indexing position to allow the iris tappet 110 to move outwards and engage with the surface of the iris cam 109, which already lies in the path of the tappet, of the lens which is moving into the operative position. When the cam 123 is in its normal position, corresponding to an indexing position of the turret, the cam 123 is spaced from the arm 116 of the bell-crank lever 114 so that the movement of the latter takes place in accordance with the movements of the iris tappet 110 and without restraint by the cam 123.

Also carried within the camera is the chassis 124 for the camera time base equipment. Also detachably mounted in the rear wall of the camera box is an electronic view finder 125 of which the view finder aperture is indicated at 126. Directly therebeneath may be arranged the mouth piece 127 of a microphone, by means of which the camera operator can talk back to the control room. The camera is closed at its sides and top by removable cover plates 128 and the turret plate may also be enclosed by a cover plate 129 secured to the bracket member 130 carried by the front of the turret plate.

Whilst a particular embodiment has been described, it will be understood that various modifications may be made without departing from the scope of the invention. For example, the adjustment of the iris diaphragm of the lens in the operative position may be effected through a friction drive instead of gear teeth as illustrated. Furthermore, although the invention is particularly applicable to television cameras, it can also be applied to conventional motion picture or other photographic cameras or optical apparatus.

We claim:

1. A television camera comprising a pick-up tube, a plurality of different lenses, a movable turret upon which said lenses are mounted for permitting the different lenses to be selectively moved into an operative position in the camera, focussing means for moving the pick-up tube axially with respect to a lens in said operative position, said focussing means including an adjustable actuating member and variable-ratio movement transmitting mechanism between said member and the tube, control means for said variable-ratio mechanism and means associated with the turret for automatically adjusting said control means in dependence upon the particular lens in the operative position.

2. Camera as claimed in claim 1, further comprising a plurality of support members, each lens being carried by one support member, co-operating means on the turret and each support member for detachably mounting each support member on the turret to secure the lenses to the turret, each support member being formed with a control surface, and a push member in the camera against which the control surface of each support member bears when the lens carried by the support member is in the operative position, said push member being operatively connected to the control means for automatically adjusting the variable-ratio mechanism in dependence upon the lens carried by said support member.

3. Camera as claimed in claim 2, wherein each said support member comprises a plate member provided with apertures, the camera further comprising dowels projecting from the turret plate and co-operating with said apertures to locate the lens carried by the support member in correct position on the turret.

4. Camera as claimed in claim 2, wherein each said support member comprises a plate member provided with at least two apertures of different diameters, the camera further comprising dowels projecting from the turret plate and co-operating with said apertures to locate the lens carried by the support member in correct position on the turret.

5. A camera as claimed in claim 2, wherein each support member is formed with a side surface constituting said control surface, said side surface being spaced a predetermined distance from the axis of the lens corresponding to the particular lens mounted on the member.

6. A television camera comprising a pick-up tube, a plurality of different lenses, a movable turret upon which said lenses are mounted for permitting the different lenses to be selectively moved into an operative position in the camera, focussing means for moving the pick-up tube axially with respect to a lens in said operative position, said focussing means including an adjustable actuating member and mechanism, including a lever the fulcrum point of which is adapted to be moved longitudinally of the lever, for transmitting movement from said member to the tube, and, associated with the turret, means for automatically adjusting the position of said fulcrum point in dependence upon the different lenses mounted on the turret.

7. A television camera comprising a pick-up tube, a plurality of different lenses, a turret rotatably carried at the front of the camera, said lenses being mounted upon said turret, and said turret permitting the different lenses to be selectively moved into an operative position in front of the pick-up tube, means for indexing said turret in the various positions in which the different lenses are in said operative position, focussing means for moving the pick-up tube axially with respect to a lens in said operative position, said focussing means including an adjustable actuating member and mechanism including a lever the fulcrum point of which is adapted to be moved longitudinally of the lever for transmitting movement from said member to the tube and, carried by the turret, a plurality of members respectively corresponding to the different lenses for respectively moving, when the associated lens is in the operative position, the fulcrum for said lever to a position corresponding to the lens in use.

8. Camera as claimed in claim 7, wherein the members comprise control surfaces carried by the turret plate, the camera further comprising a movable member which engages with a control surface corresponding to the lens which is in the operative position, said member being connected to said fulcrum to move the same.

9. A television camera as claimed in claim 8, further comprising means, independent of the control surfaces, for moving the fulcrum in the same direction as it is moved under the action of said surfaces.

10. A television camera comprising a pick-up tube, a plurality of different lens units each comprising a lens and a lens mounting, a movable turret upon which said lens units are mounted, for permitting the different lens units to be selectively moved into an operative position in the camera, means for indexing the turret when the different lenses are in the operative position, focussing means for moving the pick-up tube axially with respect to a lens in said operative position, said focussing means including an adjustable actuating member and variable-ratio movement transmitting mechanism between said member and the tube and, associated with the turret, control means for said variable-ratio mechanism, including a control-transmitting member movable in the camera and a control surface carried by the mounting of each lens unit, said surfaces being so disposed that when a lens unit has been moved by the turret into said operative position, the control surface on the mounting of said lens engages the control-transmitting member to move it in dependence upon the data of said lens to so set the ratio of transmission that a predetermined movement of said operating member will approximately cover a predetermined range of object distances independently of the length of focus of the lens selected.

11. A television camera comprising a pick-up tube, means for holding a lens unit in an operative position in the camera, focussing means for moving the pick-up tube axially with respect to a lens in said operative position, said focussing means including an adjustable operating member and a lever having a longitudinally adjustable fulcrum for transmitting movement between said member and the tube, and control mechanism, adapted to be actuated by an abutment member of each lens unit, for automatically adjusting the leverage ratio of said lens in dependence upon the abutment member of a particular lens unit.

12. A television camera comprising a pick-up tube, a plurality of different lenses, a movable turret upon which said lenses are mounted, said turret permitting the different lenses to be selectively moved into an operative lens position in the camera for producing an image in the pick-up tube, a carrier member for the pick-up tube, guiding means for guiding the carrier member and pick-up tube axially with respect to said operative lens position, an adjustable focussing control member, a lever coupled adjacent one of its ends to one said member and operatively connected adjacent its other end to the other said member, a fulcrum element for said lever, guiding means permitting longitudinal relative movement of said fulcrum element and lever, and control means associated with the lens for automatically so setting said fulcrum element when a lens has been moved by the turret into said operative lens position, in dependence upon the length of focus of said lens, that a predetermined movement of said focussing control member will approximately cover a predetermined range of object distances independent of the length of focus of the lens selected.

13. A television camera comprising a pick-up tube, a plurality of different lenses, a movable turret upon which said lenses are mounted, said turret permitting the different lenses to be selectively moved into an operative lens position in the camera for producing an image in the pick-up tube, a carrier member for the pick-up tube, guiding means for guiding the carrier member and pick-up tube axially with respect to said operative lens position, an adjustable focussing control member, a lever pivotally connected adjacent one of its ends to one said member and operatively connected adjacent its other end to the other said member, a fulcrum element for said lever, guiding means permitting longitudinal relative movement of said fulcrum and lever, a movable stop operatively connected with said fulcrum element for adjusting the position of the fulcrum element along said lever and stop members associated with each lens for, when a lens has been moved by the turret into said operative lens position, acting upon said movable stop to determine the position of said fulcrum, the dimensions of the stop members being different in dependence upon the length of focus of the lens with which each stop member is associated so that a predetermined movement of said focussing control member will approximately cover a predetermined range of object distances independent of the length of focus of the lens selected.

14. A televison camera comprising a pick-up tube, a plurality of different lens units, a movable turret upon which said lens units are detachably mounted, said turret permitting the different lens units to be selectively moved into an operative lens position in the camera for producing an image in the pick-up tube, a carrier member for the pick-up tube, guiding means for guiding the carrier member and pick-up tube axially with respect to said operative lens position, an adjustable focussing control member, a lever pivotally connected adjacent one of its ends to said carrier member and operatively connected adjacent its other end to the focussing control member, a fulcrum block for said lever, means for guiding said fulcrum blocks substantially longitudinally of said lever, relative guiding means permitting longitudinal relative movement of said fulcrum block and lever, each interchangeable lens unit comprising a lens mounted in a lens tube, said lens tube having an attachment flange formed with a cam surface, the camera further comprising a fulcrum control member mounted for sliding movement in the camera, means for operatively connecting said fulcrum element and fulcrum control member, and spring means for urging said fulcrum element and fulcrum control member into one end position, said fulcrum control member being so positioned in the camera as to be urged by the spring means against the cam surface of the lens unit which is in said lens position, the cam surface of the different lenses being different, in dependence upon the length of focus of each lens, said cam surfaces jointly with the fulcrum control member constituting means for automatically when the turret is moved to bring a lens unit into said operative position, setting said fulcrum in dependence upon the length of focus of the lens of said unit so that a predetermined movement of said focussing control member will approximately cover a predetermined range of object distances independent of the length of focus of the lens selected.

15. A television camera as claimed in claim 14, wherein said means for operatively connecting the fulcrum element and fulcrum control member include a rack connected to the fulcrum control member, a pinion rotatably mounted in engagement with said rack, a further rack connected to the fulcrum member, a further pinion rotatably mounted in engagement with said further rack, and means for transmitting rotary movement between said pinion and further pinion.

16. A television camera as claimed in claim 14, further comprising auxiliary means independent of said cams for moving the carrier member for the pick-up tube, in opposition to the action of said spring means, to a predetermined position, and means for locking said carrier member in said predetermined position.

17. A television camera as claimed in claim 16, wherein said auxiliary means includes a lost-motion coupling for permitting said fulcrum block to be moved by said cam surfaces without involving movement of said auxiliary means.

DONALD JACKSON.
JOHN DUDLEY FRANCIS GREEN.

REFERENCES CITED

The following references are of record in the file of this patent:

UNITED STATES PATENTS

| Number | Name | Date |
|---|---|---|
| 1,777,257 | Debrie | Sept. 30, 1930 |
| 2,133,882 | Zworykin | Oct. 18, 1938 |
| 2,355,136 | Bedford | Aug. 8, 1944 |
| 2,403,628 | Beers | July 9, 1946 |
| 2,421,476 | Belar et al. | June 3, 1947 |

FOREIGN PATENTS

| Number | Country | Date |
|---|---|---|
| 206,115 | Great Britain | Feb. 7, 1924 |
| 421,610 | Germany | Nov. 14, 1925 |
| 816,032 | France | Apr. 19, 1937 |